US010684833B2

(12) United States Patent
Sasanka et al.

(10) Patent No.: US 10,684,833 B2
(45) Date of Patent: Jun. 16, 2020

(54) POST-COMPILE CACHE BLOCKING ANALYZER

(71) Applicant: Intel Corporation, Santa Clara, CA (US)

(72) Inventors: Ruchira Sasanka, Hillsboro, OR (US); Karthik Raman, Beaverton, OR (US); Konstantinos Krommydas, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/921,813

(22) Filed: Mar. 15, 2018

(65) Prior Publication Data

US 2019/0042225 A1 Feb. 7, 2019

(51) Int. Cl.
*G06F 8/41* (2018.01)
*G06F 9/38* (2018.01)

(52) U.S. Cl.
CPC ............ *G06F 8/4442* (2013.01); *G06F 8/452* (2013.01); *G06F 9/381* (2013.01)

(58) Field of Classification Search
None
See application file for complete search history.

(56) References Cited

U.S. PATENT DOCUMENTS

| | | | | |
|---|---|---|---|---|
| 5,806,054 A * | 9/1998 | Bergemont | ........... | H01L 27/115 706/33 |
| 5,953,531 A * | 9/1999 | Megiddo | ................. | G06F 8/443 717/160 |
| 6,380,765 B1 * | 4/2002 | Forbes | ............ | H01L 21/823437 257/E21.621 |
| 7,318,223 B2 * | 1/2008 | Blainey | .................... | G06F 8/443 717/160 |
| 8,589,901 B2 * | 11/2013 | Lin | ........................ | G06F 8/4434 717/160 |
| 2010/0122069 A1 * | 5/2010 | Gonion | .................... | G06F 8/441 712/216 |
| 2012/0191953 A1 * | 7/2012 | Eichenberger | ...... | G06F 9/30076 712/216 |
| 2014/0281249 A1 * | 9/2014 | Waldspurger | ....... | G06F 11/3447 711/129 |
| 2016/0217078 A1 * | 7/2016 | Chen | .................... | G06F 12/0871 |
| 2019/0042225 A1 * | 2/2019 | Sasanka | .................. | G06F 8/452 |

OTHER PUBLICATIONS

Kowarschik, "An Overview of Cache Optimization Techniques and Cache{Aware Numerical Algorithms", 2002, Lecture Notes in Computer Science, vol. 2625, Springer (2002), p. 213 (Year: 2002).*
Herruzo, "Reducing Cache Misses by Loop Reordering", 2006, John von Neumann Institute for Computing, Julich, NIC Series, vol. 33, ISBN 3-00-017352-8, pp. 541-548, 2006. (Year: 2006).*
"Cache blocking techniques", software.intel.com/en-us/articles/cache-blocking-techniques, retrieved on Feb. 6, 2018, 5 pages.

* cited by examiner

*Primary Examiner* — Hossain M Morshed
(74) *Attorney, Agent, or Firm* — Jordan IP Law, LLC

(57) ABSTRACT

An embodiment of a semiconductor package apparatus may include technology to identify a nested loop in a set of executable instructions, and determine at runtime if the nested loop is a candidate for cache blocking. Other embodiments are disclosed and claimed.

25 Claims, 7 Drawing Sheets

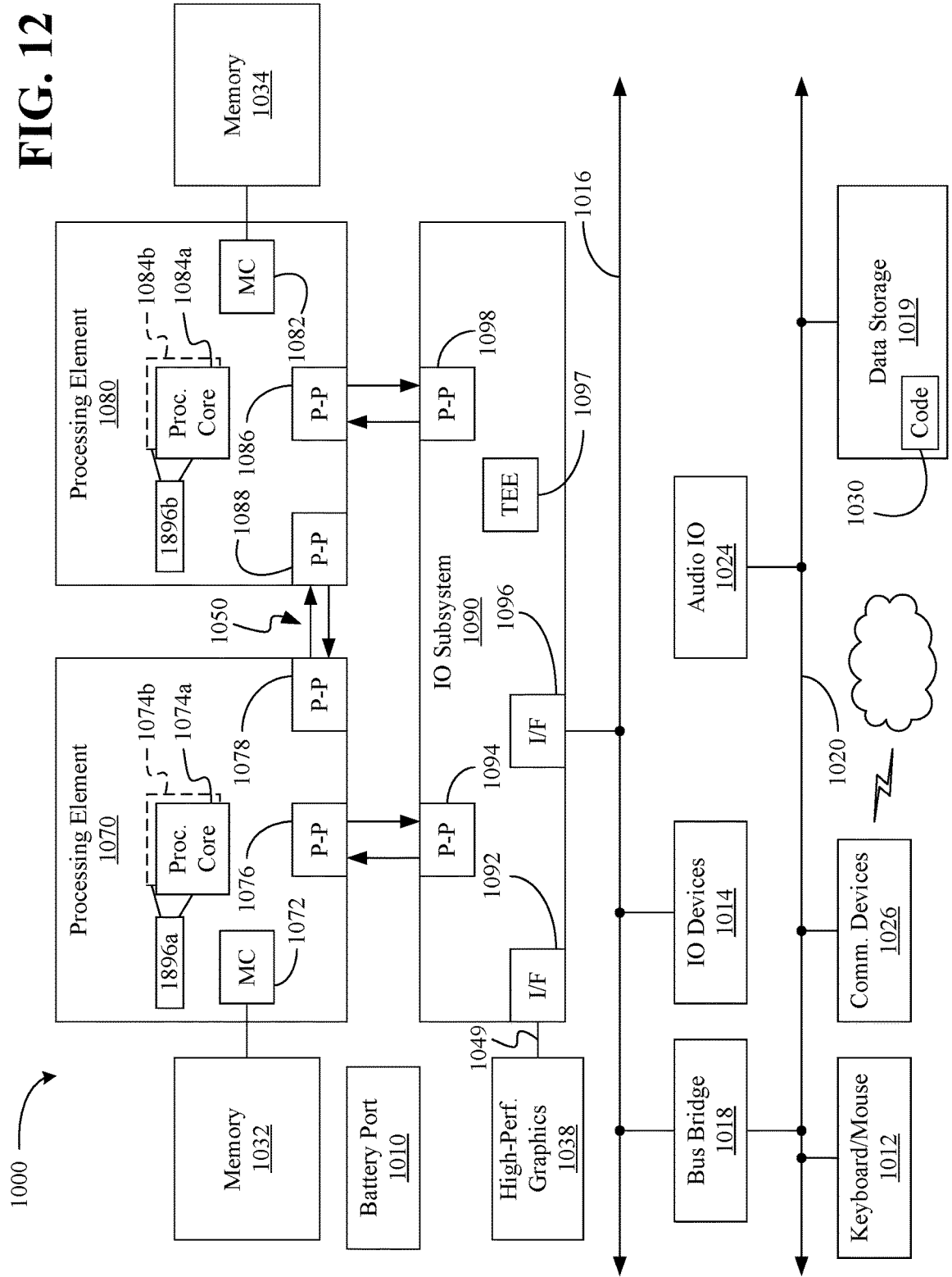

POST-COMPILE CACHE BLOCKING ANALYZER

TECHNICAL FIELD

Embodiments generally relate to compilers. More particularly, embodiments relate to a post-compile cache blocking analyzer.

BACKGROUND

Cache blocking may refer to an optimization technique that can help avoid memory bandwidth bottlenecks in some applications. Cache blocking may be based on data reuse within an application to ensure that data remains in cache across multiple uses. Blocking may be performed on many different types of data structures, including spatial data structures.

BRIEF DESCRIPTION OF THE DRAWINGS

The various advantages of the embodiments will become apparent to one skilled in the art by reading the following specification and appended claims, and by referencing the following drawings, in which:

FIG. 12 is a block diagram of an example of a system according to an embodiment.

DESCRIPTION OF EMBODIMENTS

Some embodiments may advantageously provide automatic detection of an opportunity for cache blocking. For example, some embodiments may advantageously automatically determine if a nested loop may benefit from cache blocking, determine a cache-level for the cache blocking, and/or determine a blocking factor for the cache blocking for a set of executable instructions (e.g., an existing program, application, binary executable, etc.) at runtime. Some embodiments may provide information about such optimization opportunities for further actions and/or may automatically re-compile the set of executable instructions to incorporate the determined cache blocking information (e.g., for just-in-time (JIT) compilers, runtime compilers, etc.) to automatically improve or optimize the code.

Figure 1:
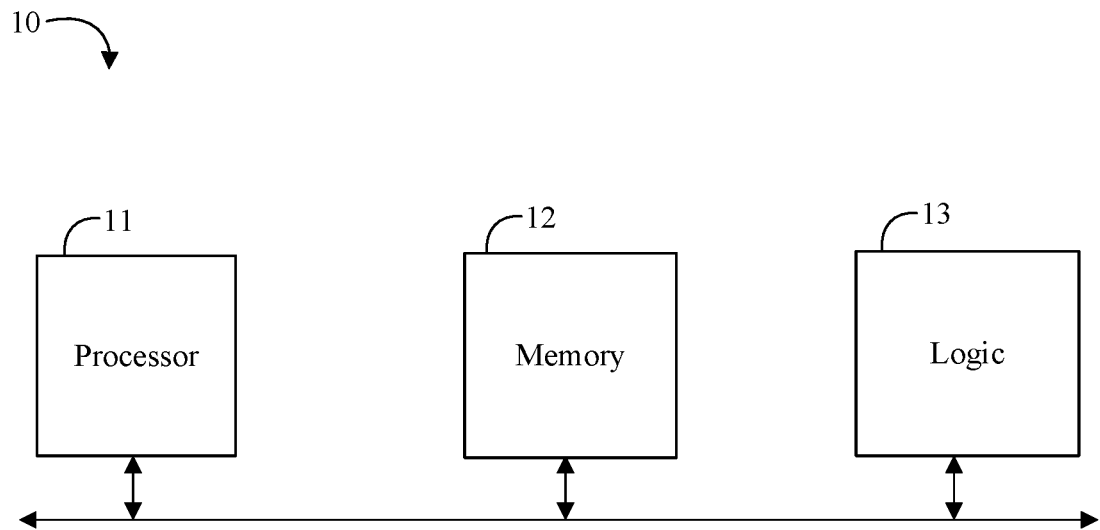
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to identify a nested loop in a set of executable instructions, and determine at runtime if the nested loop is a candidate for cache blocking. In some embodiments, the logic 13 may be configured to determine a first cache hit rate for the nested loop, re-order one or more loops of the nested loop, determine a second cache hit rate for a portion of iterations of the re-ordered nested loop, and determine if the nested loop is the candidate for cache blocking based on a comparison of the first cache hit rate and the second cache hit rate. In some embodiments, the logic 13 may alternatively be configured to determine a first cache hit rate for the nested loop, re-order one or more loops of the nested loop, determine a second cache hit rate for all iterations of the re-ordered nested loop, and determine if the nested loop is the candidate for cache blocking based on a comparison of the first cache hit rate and the second cache hit rate. For example, the logic 13 may also be configured to determine at runtime a recommended blocking factor for the cache blocking, to determine at runtime a recommended loop-level for the cache blocking, and/or to determine at runtime a recommended cache-level for the cache blocking. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, identifying the nested loop in the set of executable instructions, determining at runtime if the nested loop is a candidate for cache blocking, etc.).

Figure 2:
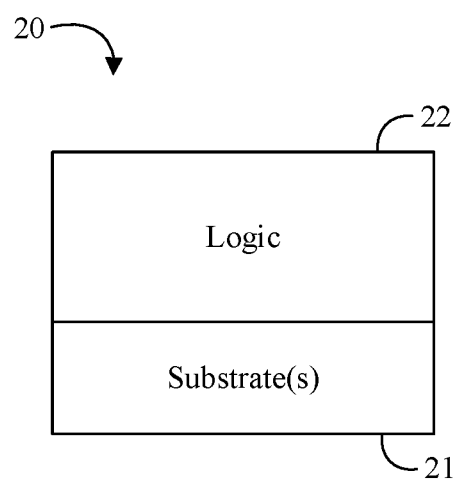
FIG. 2 is a block diagram of an example of a semiconductor package apparatus according to an embodiment.
Figure 3A:
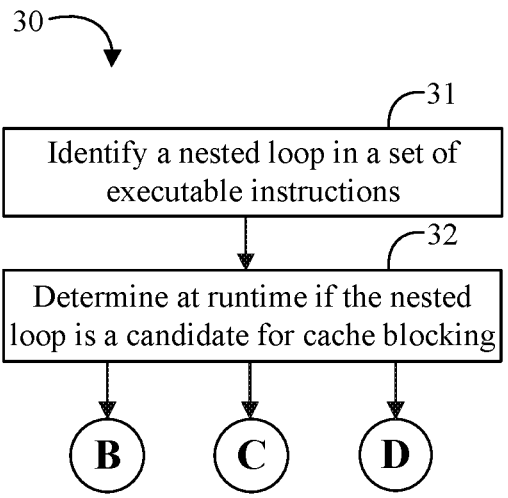
FIGS. 3A to 3D are flowcharts of an example of a method of identifying cache blocking candidates according to an embodiment.
Figure 3B:
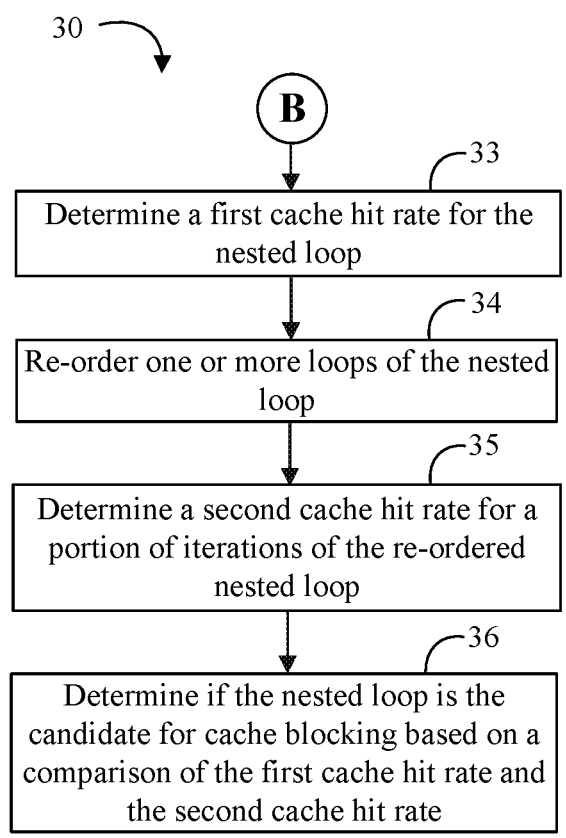
Figure 3C:
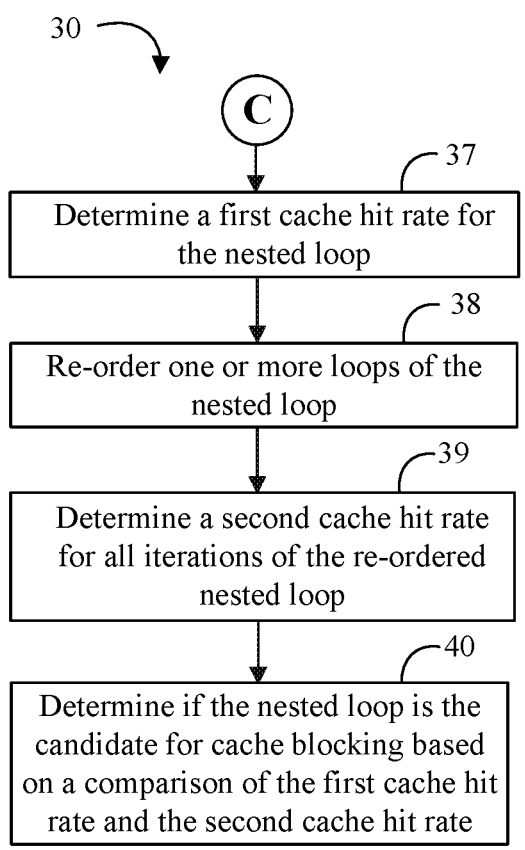
Figure 3D:
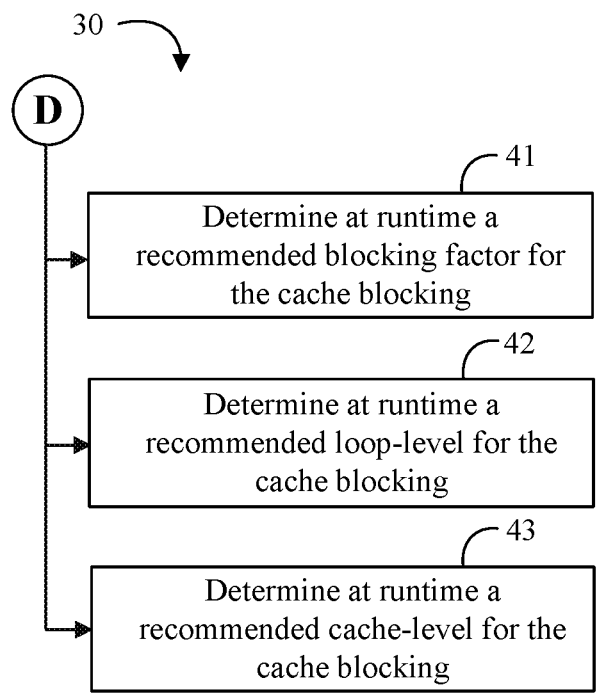

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to identify a nested loop in a set of executable instructions, and determine at runtime if the nested loop is a candidate for cache blocking. In some embodiments, the logic 22 may be configured to determine a first cache hit rate for the nested loop, re-order one or more loops of the nested loop, determine a second cache hit rate for a portion of iterations of the re-ordered nested loop, and determine if the nested loop is the candidate for cache blocking based on a comparison of the first cache hit rate and the second cache hit rate. In some embodiments, the logic 22 may alternatively be configured to determine a first cache hit rate for the nested loop, re-order one or more loops of the nested loop, determine a second cache hit rate for all iterations of the re-ordered nested loop, and determine if the nested loop is the candidate for cache blocking based on a comparison of the first cache hit rate and the second cache hit rate. For example, the logic 22 may also be configured to determine at runtime a recommended blocking factor for the cache blocking, to determine at runtime a recommended loop-level for the cache blocking, and/or to determine at runtime a recommended cache-level for the cache blocking. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 30 (FIGS. 3A to 3D), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Turning now to FIGS. 3A to 3D, an embodiment of a method 30 of identifying cache blocking candidates may include identifying a nested loop in a set of executable instructions at block 31, and determining at runtime if the nested loop is a candidate for cache blocking at block 32. Some embodiments of the method 30 may include determining a first cache hit rate for the nested loop at block 33, re-ordering one or more loops of the nested loop at block 34, determining a second cache hit rate for a portion of iterations of the re-ordered nested loop at block 35, and determining if the nested loop is the candidate for cache blocking based on a comparison of the first cache hit rate and the second cache hit rate at block 36. Some embodiments of the method 30 may alternatively include determining a first cache hit rate for the nested loop at block 37, re-ordering one or more loops of the nested loop at block 38, determining a second cache hit rate for all iterations of the re-ordered nested loop at block 39, and determining if the nested loop is the candidate for cache blocking based on a comparison of the first cache hit rate and the second cache hit rate at block 40. For example, some embodiments of the method 30 may also include determining at runtime a recommended blocking factor for the cache blocking at block 41, determining at runtime a recommended loop-level for the cache blocking at block 42, and/or determining at runtime a recommended cache-level for the cache blocking at block 43.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS).

Some embodiments may advantageously provide automatic detection of an opportunity for cache blocking. Cache misses may cost performance and some programmers may utilize a blocking technique for caches to reduce such cache misses. For example, a programmer may perform blocking manually. Manual blocking, however, may require a considerable amount of experimentation and opportunities for blocking may be missed. Some compilers may include static blocking technology, but such static analysis may not identify some opportunities for cache blocking. For a complex program, for example, it may be difficult to determine what loop nests may benefit from blocking, at what cache-level a loop should be blocked, and/or what blocking factors to use. Static compiler blocking may include many constraints and the compiler may have to prove iteration independence. Such static analysis may be insufficient to determine how a cache performs during runtime, especially for complex code. Some embodiments may advantageously automatically determine if a nested loop may benefit from cache blocking, determine a cache-level for the cache blocking, and/or determine a blocking factor for the cache blocking for a set of executable instructions (e.g., an existing program, application, binary executable, etc.) at runtime. Some embodiments may advise the programmer about such optimization opportunities and/or may automatically re-compile the set of executable instructions to incorporate the determined cache blocking information (e.g., for just-in-time (JIT) compilers, runtime compilers, etc.) to automatically improve or optimize the code.

Cache blocking may involve a re-ordering of loop iterations. Some embodiments may determine the cache hit rate for the re-ordered sequence of iterations, and may compare that hit rate with a default hit rate to determine if the re-ordering (e.g., the candidate cache blocking) may be beneficial. Some embodiments may include technology to determine the hit rate for various candidate nested loop re-orderings (e.g., candidate cache blocking), and may determine the effectiveness of the various cache blocking candidates, a recommended blocking factor for the most effective cache blocking candidate, a loop-level for the most effective cache blocking candidate, and/or a cache-level for the most effective cache blocking candidate.

Without being limited to theory of operation, caches may generally have much higher bandwidth and lower latency as compared to system memory (e.g., dynamic random access memory (DRAM), nonvolatile random access memory (NVRAM), etc.) and cache blocking may dramatically speed up memory bound applications. Some embodiments may be integrated with compiler assistance tools including vectorization and/or threading assistance tools (e.g., such as INTEL ADVISOR) to advise programmers/users about cache blocking opportunities present in their code (e.g., through a post-compile runtime analysis). Some embodiments may additionally or alternatively be integrated with JIT/runtime compilers to automatically improve or optimize code.

Some embodiments may be better understood through illustrative examples. An example of a doubly nested loop may be represented by the following pseudo-code:

```
for i=0; i < i_end; i++
    for j=0; j < j_end; j++
        loop_body
```

Another example of a doubly nested loop may include a matrix multiplication, C=A*B, in the loop body, as represented by the following pseudo-code:

```
for i=0; i < i_end; i++          // i rows (outer loop)
    for j=0; j < j_end; j++      // j columns (inner loop)
        C[i, j] = dot_product(A, i, B, j)
```

Figure 4:
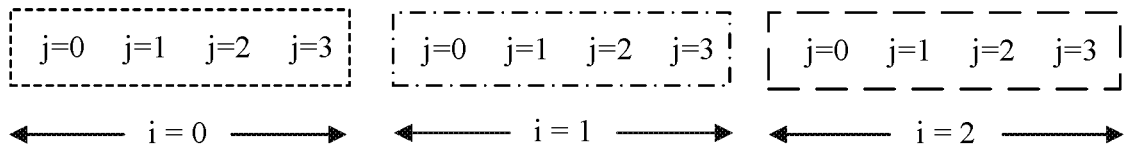
FIGS. 4 to 8 are illustrative diagrams of examples of loop iteration orders according to embodiments.

Turning now to FIG. 4, for an embodiment with values of j_end=4 and i_end=3, an outer loop iteration for i=0 may be represented by a line style with short dashes, while j=n may correspond to iteration n of the j loop (e.g., j=2 corresponds to iteration 2 of the j loop, the third iteration starting from j=0). Similarly, an outer loop iteration for i=1 may be represented by a line style with alternating dots and dashes, and i=2 may be represented by a line style with long dashes. An initial order of the iterations may have the loop body executing as shown in FIG. 4, with all of the j loop iterations for i=0 proceeding first, followed by all of the j loop iterations for i=1, and finally all of the j loop iterations for i=2. For illustrative purposes, it may be assumed that executing two (2) iterations of the j loop causes a cache to overflow (e.g., a cache miss).

Figure 5:
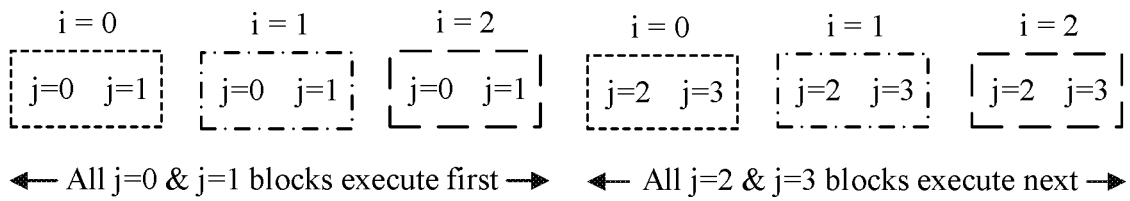

Turning now to FIG. 5, some embodiments may automatically detect an opportunity for cache blocking (e.g., as described herein) and re-order the loop iterations. As shown in FIG. 5, some embodiments may determine that loop iterations j=0 and j=1 may be executed as a block (e.g., based on cache hit rates for the re-ordered loop iterations compared to the original order). Some embodiments may execute all such blocks one after the other as shown in FIG. 5 (e.g., with the same line style designations from FIG. 4), with all of the j=0 and j=1 blocks executing first (e.g., for i=0, i=1, and i=2), followed by all j=2 and j=3 blocks executing next (e.g., for i=0, i=1, and i=2). Advantageously, with the re-ordered loop iterations the code may be able to reuse most of the data and reduce or avoid cache misses.

In the example of the matrix multiplication, some embodiments may identify the opportunity for cache blocking the columns of the B matrix. For example, if the B matrix is large and cannot fit in a level one (L1) cache (e.g., or a level two (L2) cache), cache blocking may be beneficial. For example, the re-ordered loop iterations for the matrix multiplication example may be represented in pseudo-code as follows:

```
for block=0; block < 2; block++
    for i=0; i < i_end; i++
        for j=block*2; j < (block*2 + 2); j++
            C[i, j] = dot_product(A, i, B, j)
```

Automatic Detection of Blocking Examples

In some embodiments, cache blocking may involve re-ordering of loop iterations. Some embodiments may replay cache accesses of iterations in a different order through a cache, determine the hit rate for the re-ordered situation(s), and compare the determined hit rate to the original hit rate (e.g., corresponding to the original order without re-ordering). Some embodiments may determine an estimated hit rate based on cache accesses from all re-ordered iterations, while other embodiments may determine an estimate hit rate based on cache access from only a portion of iterations of the re-ordered iterations. The iterations may be clearly demarcated either by the compiler or through binary instrumentation (e.g., with INTEL ADVISOR, INTEL PIN, etc.). In some embodiments, the iterations may also be assumed to be independent (e.g., the iterations may be suitable for reordering) for the blocked loop level. In practice, any suitable technology may be utilized to determine whether the iterations are independent (e.g., or the programmer/user may indicate that an iteration is independent).

Cache Blocking Based on a Portion of Re-Ordered Iterations Examples

Figure 6:
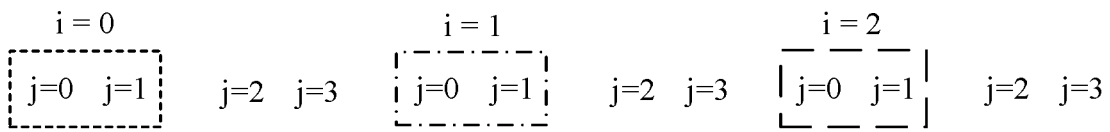

Turning now to FIG. 6, some embodiments may automatically detect an opportunity for cache blocking based on a portion of re-ordered iterations. For example, some embodiments may simulate two caches of the required size including a default cache and a block cache. All accesses of the entire nested loop may be sent through the default cache to provide a default hit rate, HitRateDefault, for the default case. As shown in FIG. 6, some embodiments may also send the memory accesses to the block cache (e.g., simultaneously in some embodiments), but only the accesses resulting from iterations j=0 and j=1 may be sent to the block cache (e.g., for i=0, i=1, and i=2). Loop iterations j=2 and j=3 may not be sent through the block cache (e.g., as indicated by no corresponding loop for i=0, i=1, or i=2).

Figure 7:
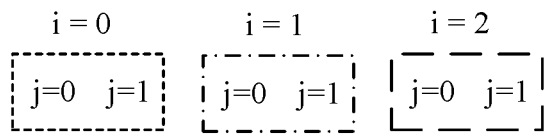

Turning now to FIG. 7, in some embodiments the simulated block cache may see only iterations j=0 and j=1 executed repeatedly. The block hit rate, HitRateBlock, may be calculated based only on the cache accesses for that portion of iterations of the re-ordered iterations. Some embodiments may ignore the block hit rate for loop iterations j=2 and j=3, or may assume that those loop iterations will show the same block hit rate, HitRateBlock. Some embodiments may then compare the block hit rate (HitRate- Block) with the default hit rate of the default cache (HitRateDefault) to determine whether the analyzed blocking may help the hit rate. Such analysis may be performed at various candidate loop levels and/or for different candidate groupings of inner loop bodies to determine multiple cache blocking candidates and/or a best cache blocking candidate.

Automatic Determination of Blocking Factor Examples

Some embodiments may automatically determine the size of a block (e.g., a blocking factor) for the cache blocking. The above examples may have assumed that two iterations (e.g., j=0 and j=1) comprised a block. Some embodiments may determine how many iterations constitute a block (e.g., for a given block cache size). When the simulation is first started, some embodiments may flush the block cache (e.g., invalidate all lines in the block cache) just before entering the nested loop. Some embodiments may then observe how many iterations it takes to fill the cache entirely or up to some threshold (e.g., 98% full). The number of whole iterations counted as completed may correspond to a recommended blocking factor (e.g., the size of a block). In the above matrix multiplication scenario, for example, two whole iterations of the inner loops j=0 and j=1 may have been executed before the block cache fills up. Some embodiments may observe the point where the block cache fills up by looking at either the number of lines filled or the number of lines victimized.

Cache Blocking Based on all Re-Ordered Iterations Examples

Figure 8:
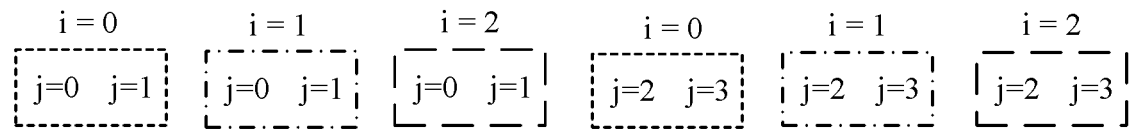

Turning now to FIG. 8, some embodiments may operate in the same manner as described above in connection with cache blocking based on a portion of the re-ordered iterations except that, instead of ignoring accesses from the loop iterations for j=2 and j=3, some embodiments may write those accesses to a file or a buffer in memory. After all the j=0 and j=1 accesses have been sent to the block cache (e.g., where the addresses are sent during execution), for example, some embodiments may send all the j=2 and j=3 accesses through the block cache (e.g., where the addresses are replayed from the file). The block hit rate, HitRateBlock, may be calculated for the entire execution based on cache accesses for all the re-ordered loop iterations. Some embodiments of the recommended cache blocking based on partial re-ordered iterations may be easier to implement (e.g., because the implementation does not require some accesses to be buffered for later replay). However, some embodiments of the recommended cache blocking based on all re-ordered iterations may provide more accurate hit rates because all cache accesses may be sent through the simulated block cache. Some embodiments may improve the accuracy of the partial re-ordered iteration option by keeping multiple block caches. For example, some embodiments may send j=0 and j=1 iterations through one block cache and j=2 and j=3 iterations through another block cache.

Automatic Determination of the Loop-Level Examples

Some embodiments may provide automatic detection of the loop-level for cache blocking. For example, loops can have multiple loop nests as may be represented in the following pseudo-code:

```
for i=0; i < i_end; i++
    for j=0; j < j_end; j++
        for k=0; k < k_end; k++
            loop_body
```

An outer loop (e.g., a nested loop structure) may be needed to perform cache blocking. When there are multiple loop nests, some embodiments may record the level and iteration count of each level. Some embodiments may then determine the highest (e.g., outermost) loop-level that has completed at least one whole iteration before the cache fills up, and may select that loop-level as the loop-level for cache blocking. In the immediately preceding loop nest, for example, if two (2) whole iterations of the outer j-loop have completed and one hundred (100) iterations from the innermost k-loop have completed, some embodiments may pick the j-loop for cache blocking (e.g., and two (2) as the blocking factor, corresponding to the two completed iterations).

If the entire loop nest has executed when the cache fills up, the loop may not benefit from cache blocking (e.g., the loop nest is small enough to completely fit within the cache). Similarly, if the blocking level detected corresponds to the outer-most loop (e.g., the i-loop in the immediately preceding loop nest), there may be no need to block. After the blocking factor and the loop-level are determined, they may be reported to a programmer/user. The programmer/user may then use appropriate compiler instructions (e.g., # pragma BLOCK_LOOP) to block a loop. Alternatively, the programmer/user may manually re-order the loop(s) (e.g., as indicated above in connection with the matrix multiplication example). In some scenarios, a programmer/user may select a blocking factor smaller than what is recommended to make blocking easier. In a JIT/runtime environment, some embodiments may automatically insert the compiler instruction in the appropriate location and/or the loop(s) may be automatically re-ordered at the executable instruction level.

Automatic Determination of the Cache-Level Examples

Some embodiments may provide automatic detection of the cache-level for cache blocking. To determine a recommended cache-level (e.g., L1, L2) for cache blocking, some embodiments may simultaneously simulate multiple cache sizes. For examples, some embodiments may simulate two block caches of 32 KB and 1 MB to model L1 and L2 caches respectively. Some embodiments may present the address stream to both caches simultaneously and may apply the above techniques independently to each of them. Some embodiments may determine respective blocking factors suitable for each cache. In some cases, the analysis may determine recommendations for how to block for both L1 and L2 at the same time (e.g., block first outer loop for L1 with four iterations per block, and the second outer loop for L2 with two iterations per block). When blocking for a shared cache (e.g., a last level cache (LLC)), some embodiments may consider only a portion of the shared corresponding to each core (e.g., 1.5 MB per core for a LLC). In some embodiments, if accesses are directly sent to the simulated L2/LLC without first filtering them with a simulated L1, the observed hit-rates may be higher as compared to a hardware L2/LLC. Because some embodiments may determine opportunities for cache blocking based on a comparison of hit rates relative to each other, such a discrepancy between the simulated cache arrangement and the physical cache arrangement may not adversely affect the above discussed cache blocking technology. Some embodiments may more closely simulate the physical cache arrangement (e.g., filtering accesses to lower level caches using an L1 cache, etc.) as needed.

Figure 9:
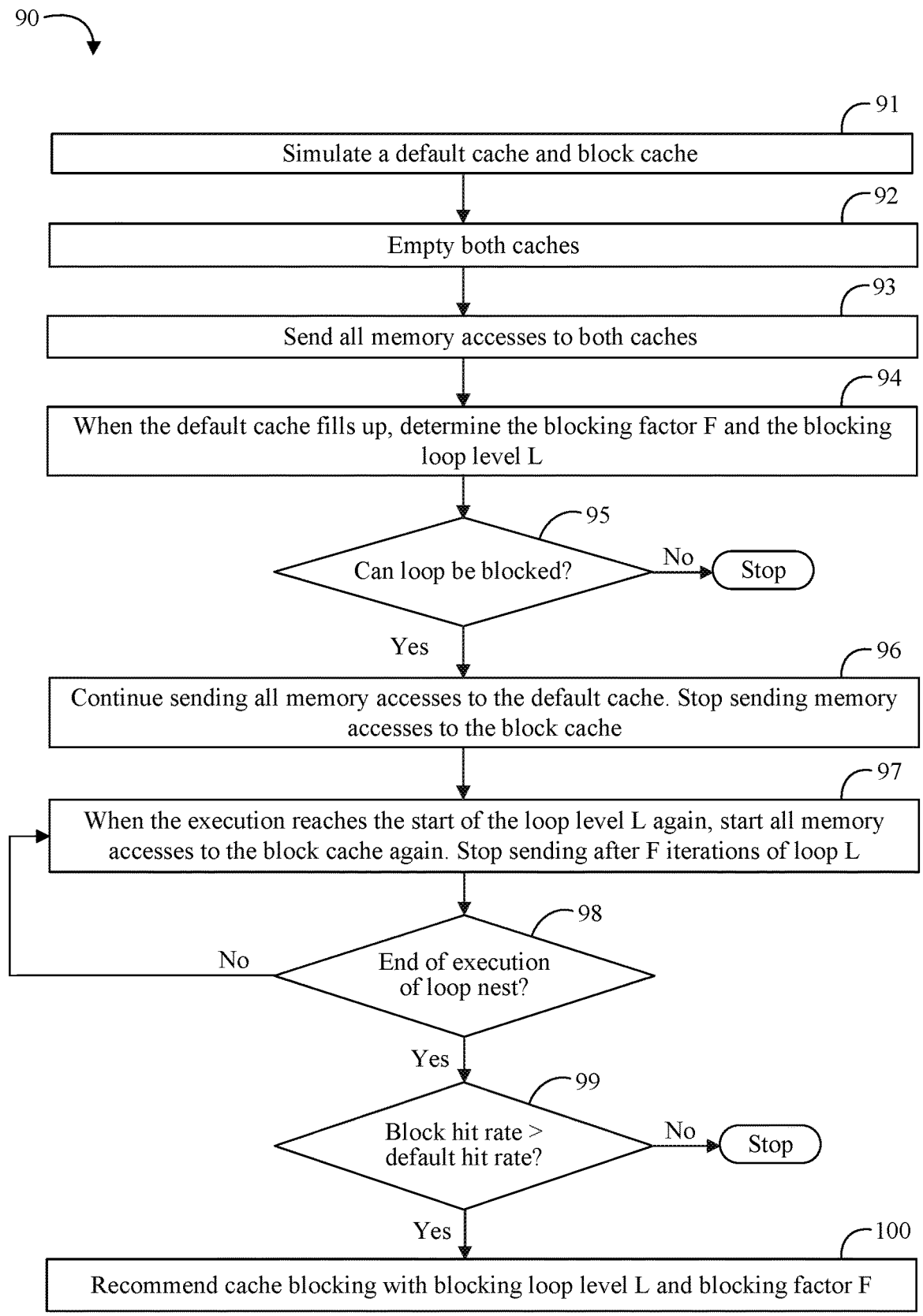
FIG. 9 is a flowchart of an example of a method of determining cache blocking according to an embodiment.

Turning now to FIG. 9, an embodiment of a method 90 of determining cache blocking for a cache of size S may include simulating a default cache and a block cache at block 91. The method 90 may include emptying both the default cache and the block cache at block 92. The method 90 may then start sending all memory accesses to both caches at block 93. At block 94, when the default cache fills up, the method 90 may determine the blocking factor F (e.g., size of a block in terms of iteration count) and the blocking loop level L (e.g., as described herein). The method 90 may then determine if the loop can be blocked at block 95 (e.g., entire nest loop executed? blocking level=outermost loop? etc.). If so, at block 96 the method 90 may continue sending all memory accesses to the default cache and stop sending memory accesses to the block cache. At block 97, when execution reaches the start of loop level L again, the method 90 may start sending all memory accesses to the block cache again, and stop sending after F iterations of loop L. At block 98, the method 90 may determine if the end of execution of the loop nest has been reached. If not, the method 90 may return to block 97. If so, the method 90 may compare the hit rate of the default cache and the block cache. If the block cache has a higher hit rate than the default cache at block 99, the method 90 may recommend cache blocking at block 100, with the loop level L and the blocking factor F (e.g., as determined at block 94). In some embodiments, to make hit rates more accurate, when block 97 is reached for the first time, the method 90 may reset cache statistics (e.g., access count, hit count, etc.).

Some embodiments may advantageously provide technology to automatically detect opportunities for cache blocking for an existing program/binary and/or in a JIT environment (e.g., a runtime environment). Some embodiments may provide various options for the implementation of the technology including one option with less storage requirement and less complexity, and another option with higher accuracy but with increased storage/processing overhead. Some embodiments may also provide technology to automatically determine blocking factor, loop-level, and a best cache-level for cache blocking. Some embodiments may provide software to detect the benefit of blocking, blocking factor, loop-level, and cache-level with a single-pass (e.g., a single execution) of the program.

Figure 10A:
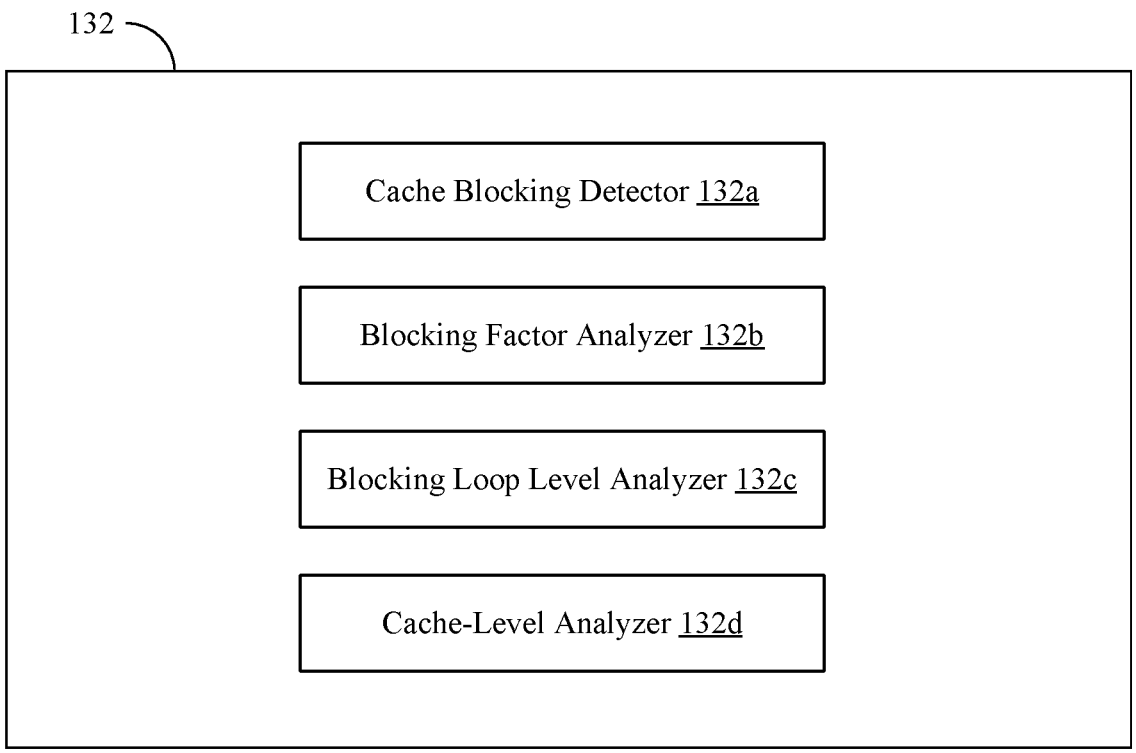
FIGS. 10A and 10B are block diagrams of examples of cache blocking detection apparatuses according to embodiments.

FIG. 10A shows a cache blocking detection apparatus 132 (132*a*-132*d*) that may implement one or more aspects of the method 30 (FIGS. 3A to 3D) and/or the method 90 (FIG. 9). The cache blocking detection apparatus 132, which may include logic instructions, configurable logic, fixed-functionality hardware logic, may be readily substituted for the logic 13 (FIG. 1), already discussed. A cache blocking detector 132*a* may include technology to identify a nested loop in a set of executable instructions, and determine at runtime if the nested loop is a candidate for cache blocking. In some embodiments, the cache blocking detector 132*a* may be configured to determine a first cache hit rate for the nested loop, re-order one or more loops of the nested loop, determine a second cache hit rate for a portion of iterations of the re-ordered nested loop, and determine if the nested loop is the candidate for cache blocking based on a comparison of the first cache hit rate and the second cache hit rate. In some embodiments, the cache blocking detector 132*a* may alternatively be configured to determine a first cache hit rate for the nested loop, re-order one or more loops of the nested loop, determine a second cache hit rate for all iterations of the re-ordered nested loop, and determine if the nested loop is the candidate for cache blocking based on a comparison of the first cache hit rate and the second cache hit rate. A blocking factor analyzer 132*b* may include technology to determine at runtime a recommended blocking factor for the cache blocking. A blocking loop level analyzer 132*c* may include technology to determine at runtime a recommended loop-level for the cache blocking.

A cache-level analyzer 132*d* may include technology to determine at runtime a recommended cache-level for the cache blocking.

Figure 10B:
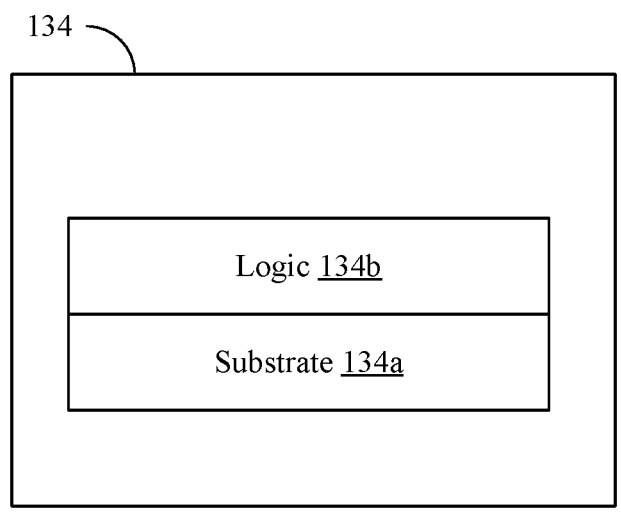

Turning now to FIG. 10B, cache blocking detection apparatus 134 (134*a*, 134*b*) is shown in which logic 134*b* (e.g., transistor array and other integrated circuit/IC components) is coupled to a substrate 134*a* (e.g., silicon, sapphire, gallium arsenide). The logic 134*b* may generally implement one or more aspects of the method 30 (FIGS. 3A to 3D) and/or the method 90 (FIG. 9). Thus, the logic 134*b* may identify a nested loop in a set of executable instructions, and determine at runtime if the nested loop is a candidate for cache blocking. In some embodiments, the logic 134*b* may be configured to determine a first cache hit rate for the nested loop, re-order one or more loops of the nested loop, determine a second cache hit rate for a portion of iterations of the re-ordered nested loop, and determine if the nested loop is the candidate for cache blocking based on a comparison of the first cache hit rate and the second cache hit rate. In some embodiments, the logic 134*b* may alternatively be configured to determine a first cache hit rate for the nested loop, re-order one or more loops of the nested loop, determine a second cache hit rate for all iterations of the re-ordered nested loop, and determine if the nested loop is the candidate for cache blocking based on a comparison of the first cache hit rate and the second cache hit rate. For example, the logic 134*b* may also be configured to determine at runtime a recommended blocking factor for the cache blocking, to determine at runtime a recommended loop-level for the cache blocking, and/or to determine at runtime a recommended cache-level for the cache blocking. In one example, the apparatus 134 is a semiconductor die, chip and/or package.

Figure 11:
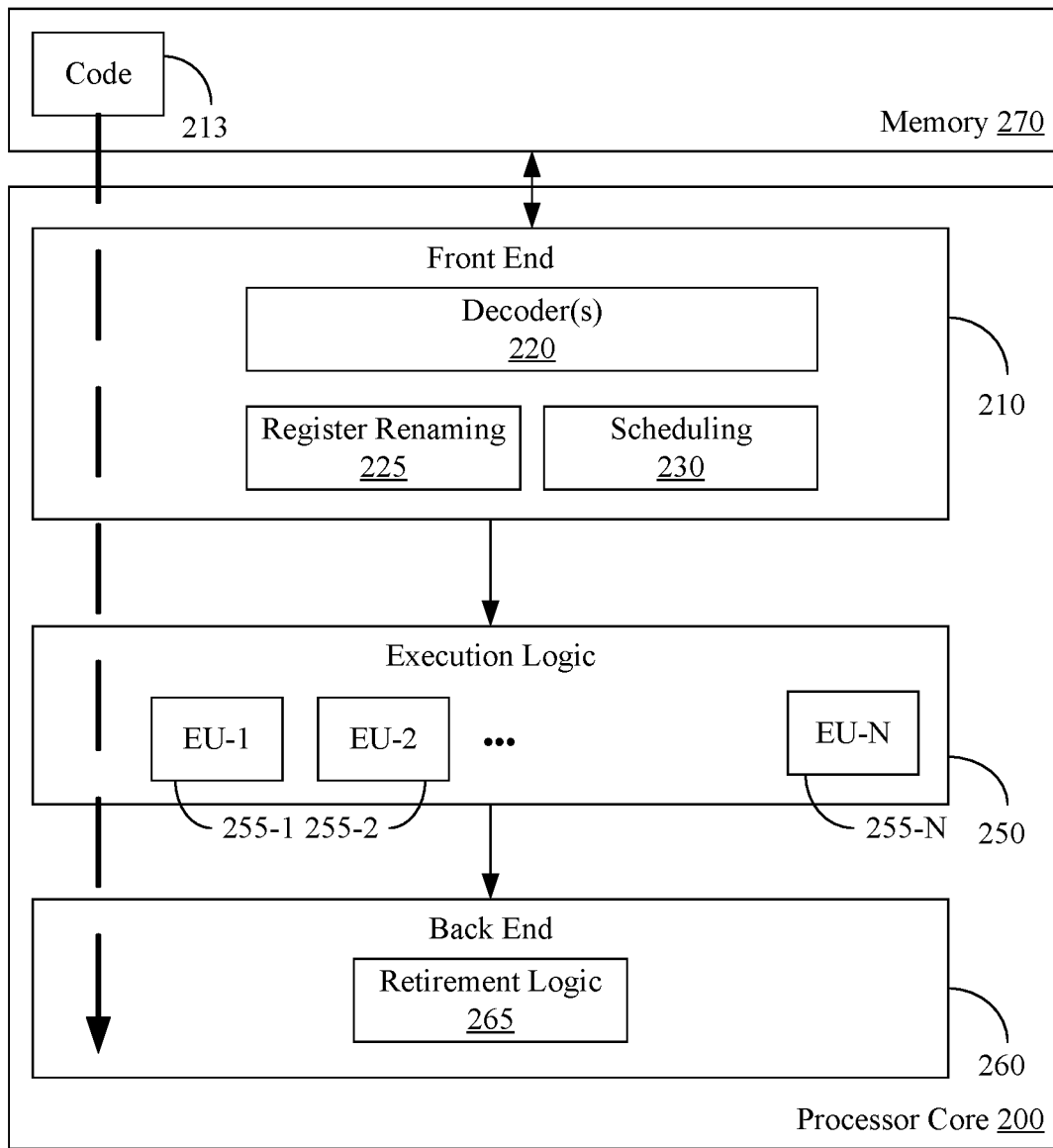
FIG. 11 is a block diagram of an example of a processor according to an embodiment.

FIG. 11 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 11, a processing element may alternatively include more than one of the processor core 200 illustrated in FIG. 11. The processor core 200 may be a single-threaded core or, for at least one embodiment, the processor core 200 may be multithreaded in that it may include more than one hardware thread context (or "logical processor") per core.

FIG. 11 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3D) and/or the method 90 (FIG. 9), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 11, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 12, shown is a block diagram of a system 1000 embodiment in accordance with an embodiment. Shown in FIG. 12 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 12 may be implemented as a multi-drop bus rather than point-to-point interconnect.

As shown in FIG. 12, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 11.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 12, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 12, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 12, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3D) and/or the method 90 (FIG. 9), already discussed, and may be similar to the code 213 (FIG. 11), already discussed. Further, an audio I/O 1024 may be coupled to second bus 1020.

Note that other embodiments are contemplated. For example, instead of the point-to-point architecture of FIG.

12, a system may implement a multi-drop bus or another such communication topology.

ADDITIONAL NOTES AND EXAMPLES

Example 1 may include an electronic processing system, comprising a processor, memory communicatively coupled to the processor, and logic communicatively coupled to the processor to identify a nested loop in a set of executable instructions, and determine at runtime if the nested loop is a candidate for cache blocking.

Example 2 may include the system of Example 1, wherein the logic is further to determine a first cache hit rate for the nested loop, re-order one or more loops of the nested loop, determine a second cache hit rate for a portion of iterations of the re-ordered nested loop, and determine if the nested loop is the candidate for cache blocking based on a comparison of the first cache hit rate and the second cache hit rate.

Example 3 may include the system of Example 1, wherein the logic is further to determine a first cache hit rate for the nested loop, re-order one or more loops of the nested loop, determine a second cache hit rate for all iterations of the re-ordered nested loop, and determine if the nested loop is the candidate for cache blocking based on a comparison of the first cache hit rate and the second cache hit rate.

Example 4 may include the system of any of Examples 1 to 3, wherein the logic is further to determine at runtime a recommended blocking factor for the cache blocking.

Example 5 may include the system of any of Examples 1 to 3, wherein the logic is further to determine at runtime a recommended loop-level for the cache blocking.

Example 6 may include the system of any of Examples 1 to 3, wherein the logic is further to determine at runtime a recommended cache-level for the cache blocking.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to identify a nested loop in a set of executable instructions, and determine at runtime if the nested loop is a candidate for cache blocking.

Example 8 may include the apparatus of Example 7, wherein the logic is further to determine a first cache hit rate for the nested loop, re-order one or more loops of the nested loop, determine a second cache hit rate for a portion of iterations of the re-ordered nested loop, and determine if the nested loop is the candidate for cache blocking based on a comparison of the first cache hit rate and the second cache hit rate.

Example 9 may include the apparatus of Example 7, wherein the logic is further to determine a first cache hit rate for the nested loop, re-order one or more loops of the nested loop, determine a second cache hit rate for all iterations of the re-ordered nested loop, and determine if the nested loop is the candidate for cache blocking based on a comparison of the first cache hit rate and the second cache hit rate.

Example 10 may include the apparatus of any of Examples 7 to 9, wherein the logic is further to determine at runtime a recommended blocking factor for the cache blocking.

Example 11 may include the apparatus of any of Examples 7 to 9, wherein the logic is further to determine at runtime a recommended loop-level for the cache blocking.

Example 12 may include the apparatus of any of Examples 7 to 9, wherein the logic is further to determine at runtime a recommended cache-level for the cache blocking.

Example 13 may include the apparatus of any of Examples 7 to 9, wherein the logic coupled to the one or more substrates includes transistor channel regions that are positioned within the one or more substrates.

Example 14 may include a method of identifying cache blocking candidates, comprising identifying a nested loop in a set of executable instructions, and determining at runtime if the nested loop is a candidate for cache blocking.

Example 15 may include the method of Example 14, further comprising determining a first cache hit rate for the nested loop, re-ordering one or more loops of the nested loop, determining a second cache hit rate for a portion of iterations of the re-ordered nested loop, and determining if the nested loop is the candidate for cache blocking based on a comparison of the first cache hit rate and the second cache hit rate.

Example 16 may include the method of Example 14, further comprising determining a first cache hit rate for the nested loop, re-ordering one or more loops of the nested loop, determining a second cache hit rate for all iterations of the re-ordered nested loop, and determining if the nested loop is the candidate for cache blocking based on a comparison of the first cache hit rate and the second cache hit rate.

Example 17 may include the method of any of Examples 14 to 16, further comprising determining at runtime a recommended blocking factor for the cache blocking.

Example 18 may include the method of any of Examples 14 to 16, further comprising determining at runtime a recommended loop-level for the cache blocking.

Example 19 may include the method of any of Examples 14 to 16, further comprising determining at runtime a recommended cache-level for the cache blocking.

Example 20 may include at least one computer readable medium, comprising a set of instructions, which when executed by a computing device, cause the computing device to identify a nested loop in a set of executable instructions, and determine at runtime if the nested loop is a candidate for cache blocking.

Example 21 may include the at least one computer readable medium of Example 20, comprising a further set of instructions, which when executed by the computing device, cause the computing device to determine a first cache hit rate for the nested loop, re-order one or more loops of the nested loop, determine a second cache hit rate for a portion of iterations of the re-ordered nested loop, and determine if the nested loop is the candidate for cache blocking based on a comparison of the first cache hit rate and the second cache hit rate.

Example 22 may include the at least one computer readable medium of Example 20, comprising a further set of instructions, which when executed by the computing device, cause the computing device to determine a first cache hit rate for the nested loop, re-order one or more loops of the nested loop, determine a second cache hit rate for all iterations of the re-ordered nested loop, and determine if the nested loop is the candidate for cache blocking based on a comparison of the first cache hit rate and the second cache hit rate.

Example 23 may include the at least one computer readable medium of any of Examples 20 to 22, comprising a further set of instructions, which when executed by the computing device, cause the computing device to determine at runtime a recommended blocking factor for the cache blocking.

Example 24 may include the at least one computer readable medium of any of Examples 20 to 22, comprising a further set of instructions, which when executed by the computing device, cause the computing device to determine at runtime a recommended loop-level for the cache blocking.

Example 25 may include the at least one computer readable medium of any of Examples 20 to 22, comprising a further set of instructions, which when executed by the computing device, cause the computing device to determine at runtime a recommended cache-level for the cache blocking.

Example 26 may include a cache blocking detection apparatus, comprising means for identifying a nested loop in a set of executable instructions, and means for determining at runtime if the nested loop is a candidate for cache blocking.

Example 27 may include the apparatus of Example 26, further comprising means for determining a first cache hit rate for the nested loop, means for re-ordering one or more loops of the nested loop, means for determining a second cache hit rate for a portion of iterations of the re-ordered nested loop, and means for determining if the nested loop is the candidate for cache blocking based on a comparison of the first cache hit rate and the second cache hit rate.

Example 28 may include the apparatus of Example 26, further comprising means for determining a first cache hit rate for the nested loop, means for re-ordering one or more loops of the nested loop, means for determining a second cache hit rate for all iterations of the re-ordered nested loop, and means for determining if the nested loop is the candidate for cache blocking based on a comparison of the first cache hit rate and the second cache hit rate.

Example 29 may include the apparatus of any of Examples 26 to 28, further comprising means for determining at runtime a recommended blocking factor for the cache blocking.

Example 30 may include the apparatus of any of Examples 26 to 28, further comprising means for determining at runtime a recommended loop-level for the cache blocking.

Example 31 may include the apparatus of any of Examples 26 to 28, further comprising means for determining at runtime a recommended cache-level for the cache blocking.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
identify a nested loop in a set of executable instructions;
determine at runtime if the nested loop is a candidate for cache blocking, wherein to determine if the nested loop is a candidate for cache blocking, the logic is to:
simulate a default cache and a block cache,
empty both the default cache and the block cache,
send all memory accesses to both caches, and
determine a blocking factor and a loop level factor in response to the default cache filling up;
determine whether the end of the nested loop has been reached in response to the nested loop being blocked;
determine whether the block cache has a higher hit rate than the default cache in response to the end of the nested loop; and
recommend cache blocking with the loop level factor and the blocking factor in response to the block hit rate being greater than the default hit rate.

2. The system of claim 1, wherein the logic is further to:
determine a first cache hit rate for the nested loop;
re-order one or more loops of the nested loop;

determine a second cache hit rate for a portion of iterations of the re-ordered nested loop; and
determine if the nested loop is the candidate for cache blocking based on a comparison of the first cache hit rate and the second cache hit rate.

3. The system of claim 1, wherein the logic is further to:
determine a first cache hit rate for the nested loop;
re-order one or more loops of the nested loop;
determine a second cache hit rate for all iterations of the re-ordered nested loop; and
determine if the nested loop is the candidate for cache blocking based on a comparison of the first cache hit rate and the second cache hit rate.

4. The system of claim 1, wherein the logic is further to:
determine at runtime a recommended blocking factor for the cache blocking.

5. The system of claim 1, wherein the logic is further to:
determine at runtime a recommended loop-level for the cache blocking.

6. The system of claim 1, wherein the logic is further to:
determine at runtime a recommended cache-level for the cache blocking.

7. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
  identify a nested loop in a set of executable instructions;
  determine at runtime if the nested loop is a candidate for cache blocking, wherein to determine if the nested loop is a candidate for cache blocking, the logic coupled to the one or more substrates is to:
    simulate a default cache and a block cache,
    empty both the default cache and the block cache,
    send all memory accesses to both caches, and
    determine a blocking factor and a loop level factor in response to the default cache filling up;
  determine whether the end of the nested loop has been reached in response to the nested loop being blocked;
  determine whether the block cache has a higher hit rate than the default cache in response to the end of the nested loop; and
  recommend cache blocking with the loop level factor and the blocking factor in response to the block hit rate being greater than the default hit rate.

8. The apparatus of claim 7, wherein the logic is further to:
determine a first cache hit rate for the nested loop;
re-order one or more loops of the nested loop;
determine a second cache hit rate for a portion of iterations of the re-ordered nested loop; and
determine if the nested loop is the candidate for cache blocking based on a comparison of the first cache hit rate and the second cache hit rate.

9. The apparatus of claim 7, wherein the logic is further to:
determine a first cache hit rate for the nested loop;
re-order one or more loops of the nested loop;
determine a second cache hit rate for all iterations of the re-ordered nested loop; and
determine if the nested loop is the candidate for cache blocking based on a comparison of the first cache hit rate and the second cache hit rate.

10. The apparatus of claim 7, wherein the logic is further to:
determine at runtime a recommended blocking factor for the cache blocking.

11. The apparatus of claim 7, wherein the logic is further to:
determine at runtime a recommended loop-level for the cache blocking.

12. The apparatus of claim 7, wherein the logic is further to:
determine at runtime a recommended cache-level for the cache blocking.

13. The apparatus of claim 7, wherein the logic coupled to the one or more substrates includes transistor channel regions that are positioned within the one or more substrates.

14. A method of identifying cache blocking candidates, comprising:
identifying a nested loop in a set of executable instructions;
determining at runtime if the nested loop is a candidate for cache blocking, wherein the determining includes:
  simulating a default cache and a block cache,
  emptying both the default cache and the block cache,
  sending all memory accesses to both caches, and
  determining a blocking factor and a loop level factor in response to the default cache filling up;
determining whether the end of the nested loop has been reached in response to the nested loop being blocked;
determining whether the block cache has a higher hit rate than the default cache in response to the end of the nested loop; and
recommending cache blocking with the loop level factor and the blocking factor in response to the block hit rate being greater than the default hit rate.

15. The method of claim 14, further comprising:
determining a first cache hit rate for the nested loop;
re-ordering one or more loops of the nested loop;
determining a second cache hit rate for a portion of iterations of the re-ordered nested loop; and
determining if the nested loop is the candidate for cache blocking based on a comparison of the first cache hit rate and the second cache hit rate.

16. The method of claim 14, further comprising:
determining a first cache hit rate for the nested loop;
re-ordering one or more loops of the nested loop;
determining a second cache hit rate for all iterations of the re-ordered nested loop; and
determining if the nested loop is the candidate for cache blocking based on a comparison of the first cache hit rate and the second cache hit rate.

17. The method of claim 14, further comprising:
determining at runtime a recommended blocking factor for the cache blocking.

18. The method of claim 14, further comprising:
determining at runtime a recommended loop-level for the cache blocking.

19. The method of claim 14, further comprising:
determining at runtime a recommended cache-level for the cache blocking.

20. At least one non-transitory computer readable medium, comprising a set of instructions, which when executed by a computing device, cause the computing device to:
identify a nested loop in a set of executable instructions;
determine at runtime if the nested loop is a candidate for cache blocking, wherein to determine if the nested loop is a candidate for cache blocking, the instructions, when executed, cause the computing device to:
simulate a default cache and a block cache,
empty both the default cache and the block cache,
send all memory accesses to both caches, and
determine a blocking factor and a loop level factor in response to the default cache filling up;
determine whether the end of the nested loop has been reached in response to the nested loop being blocked;
determine whether the block cache has a higher hit rate than the default cache in response to the end of the nested loop; and
recommend cache blocking with the loop level factor and the blocking factor in response to the block hit rate being greater than the default hit rate.

21. The at least one non-transitory computer readable medium of claim 20, comprising a further set of instructions, which when executed by the computing device, cause the computing device to:
determine a first cache hit rate for the nested loop;
re-order one or more loops of the nested loop;
determine a second cache hit rate for a portion of iterations of the re-ordered nested loop; and
determine if the nested loop is the candidate for cache blocking based on a comparison of the first cache hit rate and the second cache hit rate.

22. The at least one non-transitory computer readable medium of claim 20, comprising a further set of instructions, which when executed by the computing device, cause the computing device to:
determine a first cache hit rate for the nested loop;
re-order one or more loops of the nested loop;
determine a second cache hit rate for all iterations of the re-ordered nested loop; and
determine if the nested loop is the candidate for cache blocking based on a comparison of the first cache hit rate and the second cache hit rate.

23. The at least one non-transitory computer readable medium of claim 20, comprising a further set of instructions, which when executed by the computing device, cause the computing device to:
determine at runtime a recommended blocking factor for the cache blocking.

24. The at least one non-transitory computer readable medium of claim 20, comprising a further set of instructions, which when executed by the computing device, cause the computing device to:
determine at runtime a recommended loop-level for the cache blocking.

25. The at least one non-transitory computer readable medium of claim 20, comprising a further set of instructions, which when executed by the computing device, cause the computing device to:
determine at runtime a recommended cache-level for the cache blocking.

* * * * *